US010162988B2

(12) United States Patent
Chen et al.

(10) Patent No.: US 10,162,988 B2
(45) Date of Patent: Dec. 25, 2018

(54) RADIO FREQUENCY TRANSMISSION METHOD AND DEVICE THEREOF

(71) Applicant: Nyquest Corporation Limited, Hsinchu (TW)

(72) Inventors: Yu-Chu Chen, Hsinchu (TW); Kuan-Jung Chen, Hsinchu (TW); Chih-Hsuan Lee, Hsinchu (TW)

(73) Assignee: NYQUEST CORPORATION LIMITED, Hsinchu (TW)

( * ) Notice: Subject to any disclaimer, the term of this patent is extended or adjusted under 35 U.S.C. 154(b) by 0 days.

(21) Appl. No.: 15/967,061

(22) Filed: Apr. 30, 2018

(65) Prior Publication Data
US 2018/0322318 A1 Nov. 8, 2018

(30) Foreign Application Priority Data
May 3, 2017 (TW) .............................. 106114716 A (51) Int. Cl.
*G06K 7/10* (2006.01)
*G06K 19/07* (2006.01)

(52) U.S. Cl.
CPC ..... *G06K 7/10039* (2013.01); *G06K 7/10198* (2013.01); *G06K 19/0723* (2013.01)

(58) Field of Classification Search
CPC ........... G06K 7/10039; G06K 7/10198; G06K 19/0723

USPC ...................................................... 340/13.26
See application file for complete search history.

(56) References Cited

U.S. PATENT DOCUMENTS

| 2007/0139159 A1* | 6/2007 | Mittal | ..................... H04L 7/046 340/10.1 |
| 2018/0089549 A1* | 3/2018 | Wu | ..................... G06K 19/0723 |

FOREIGN PATENT DOCUMENTS

| TW | 200638277 A | 11/2006 |
| TW | 200905570 A | 2/2009 |

OTHER PUBLICATIONS

TIPO Office Action, Patent Application Serial No. TW106114716, dated Dec. 5, 2017, Taiwan.

* cited by examiner

*Primary Examiner* — Ali Neyzari
(74) *Attorney, Agent, or Firm* — Rabin & Berdo, P.C.

(57) ABSTRACT

A radio frequency transmission method and a device thereof are provided. The method includes: transmitting a radio frequency command by a radio frequency reader; receiving the radio frequency command by a radio frequency tag, wherein the radio frequency command includes bits; determining a logic level of each of the bits based upon a time length of each of the bits at a voltage level of a voltage waveform by the radio frequency tag; and determining whether to transmit a response signal in response to the radio frequency reader based upon the logic level of each of the bits by the radio frequency tag.

22 Claims, 5 Drawing Sheets

RADIO FREQUENCY TRANSMISSION METHOD AND DEVICE THEREOF

CROSS-REFERENCE TO RELATED APPLICATION

This non-provisional application claims priority under 35 U.S.C. § 119(a) to Patent Application No. 106114716 filed in Taiwan, R.O.C. on May 3, 2017, the entire contents of which are hereby incorporated by reference.

BACKGROUND

Technical Field

The instant disclosure relates to a radio frequency transmission method and a device thereof.

Related Art

Radio Frequency Identification (RFID) is a wireless communication technique. Signals can be modulated into electromagnetic field of radio frequency, and data can be transmitted by a radio frequency tag attached to an object. According to wireless radio frequency tags with or without internal power supply, the wireless radio frequency tags can be classified into an active type or a passive type. An integrated circuit inside the passive wireless radio frequency tag can be driven by electromagnetic waves transmitted by a radio frequency reader. While the strength of signals received by the radio frequency tag is strong enough, the radio frequency tag is capable of transmitting data to the radio frequency reader. The active radio frequency tag can actively transmit data in a memory inside the radio frequency tag to the radio frequency reader by internal power anytime.

In daily life, the wireless radio frequency tags have been widely used. There are examples as follow. Product barcodes can be read via radio frequency tags for calculation of an amount of money of purchase during a checking process. Product barcodes can be read via radio frequency tags for verification of stock condition during a warehousing process. Product barcodes can be read via radio frequency tags for verification of logistics condition during a product shipping or stocking process. Luggage can be classified by radio frequency tags. Radio frequency tags can be attached on personnel or objects for tracking and managing of stocks and assets. Radio frequency tags can be used for anti-counterfeiting techniques of banknotes and products. Moreover, radio frequency tags can be planted into human bodies for personal identification. Nevertheless, in applications of the conventional wireless radio frequency tags, while several wireless radio frequency tags transmit radio frequency signals to one radio frequency reader at the same time, multiple radio frequency signals will interfere with one another. As a result, radio frequency signals received by the radio frequency reader may be different from those transmitted by the radio frequency tags. In addition, there may only be a part of the radio frequency signals being received by the radio frequency reader successfully. The above situation will lead to a failure of radio frequency communication.

SUMMARY

To address the above issue, the instant disclosure provides a radio frequency transmission method and a device thereof.

According to an embodiment, a radio frequency transmission device comprises a radio frequency reader, a radio frequency tag, and another radio frequency tag. The radio frequency reader is for transmitting a radio frequency command. The radio frequency command comprises a plurality of bits. The radio frequency tag receives the radio frequency command. The radio frequency tag determines a logic level of each of the bits based upon a time length of each of the bits at a voltage level of a voltage waveform. The radio frequency tag determines whether the radio frequency command is the same as a plurality of first prestored commands based upon the logic level of each of the bits to determine whether to transmit a response signal in response to the radio frequency reader based upon a result of determination of whether the radio frequency command is the same as the first prestored commands. Another radio frequency tag receives the radio frequency command. The another radio frequency tag determines a logic level of each of the bits based upon a time length of each of the bits at the voltage level of the voltage waveform. The another radio frequency tag determines whether the radio frequency command is the same as a plurality of second prestored commands based upon the logic level of each of the bits to determine whether to transmit another response signal in response to the radio frequency reader based upon a result of determination of whether the radio frequency command is the same as the second prestored commands. While the radio frequency tag transmits the response signal, the radio frequency tag transmits the response signal at a preset time point, and while the another radio frequency tag transmits the another response signal, the another radio frequency tag transmits the another response signal at another preset time point. A time difference of the preset time point and the another preset time point is greater than a threshold.

According to an embodiment, the radio frequency reader waits for a preset delay time before transmitting the radio frequency command.

According to an embodiment, the radio frequency tag compares the radio frequency command with first prestored commands based upon the logic level of each of the bits to determine whether to transmit the response signal. While the radio frequency command is different from each of the first prestored commands, the radio frequency tag does not transmit the response signal.

According to an embodiment, while the radio frequency command is the same as one of the prestored commands, the radio frequency tag transmits the response signal at the preset time point.

According to an embodiment, the another radio frequency tag compares the radio frequency command with second prestored commands based upon the logic level of each of the bits. While the radio frequency command is the same as one of the second prestored commands, the another radio frequency tag transmits another response signal at another preset time point. Wherein a time difference of the another preset time point and the preset time point is greater than a threshold.

According to an embodiment, the wave form includes at least one voltage selected from a group consisting of high voltage, low voltage, zero voltage, positive voltage, and negative voltage.

According to an embodiment, while the radio frequency tag transmits the response signal, the radio frequency tag waits for a preset delay time before transmitting the response signal.

According to an embodiment, the radio frequency tag comprises a process circuit and an application circuit. The process circuit of the radio frequency tag determines the logic level of each of the bits based upon the time length of each of the bits at the voltage level of the voltage waveform to determine whether to generate the response signal and a control signal based upon the radio frequency command. The application circuit is controlled by the control signal.

According to an embodiment, the radio frequency tag further comprises a physical button coupled to the process circuit of the radio frequency tag. The physical button of the radio frequency tag comprises a first press condition and a second press condition. The process circuit of the radio frequency tag generates the response signals with different logic levels based upon the first press condition and the second press condition.

According to an embodiment, the radio frequency reader comprises a process circuit and an application circuit. The process circuit of the radio frequency reader determines a logic level of each of bits of the response signal based upon a time length of each of the bits of the response signal at the voltage level of the voltage waveform to determine whether to output a control signal based upon the response signal. The application circuit is controlled by the outputted signal.

According to an embodiment, the process circuit of the radio frequency reader is further for generating the radio frequency command. The radio frequency reader further comprises a physical button coupled to the process circuit. The physical button of the radio frequency reader comprises a first press condition and a second press condition. The process circuit of the radio frequency reader generates the radio frequency commands with different logic levels based upon the first press condition and the second press condition.

According to an embodiment, a radio frequency transmission method comprises transmitting a radio frequency command by a radio frequency reader; receiving the radio frequency command by a radio frequency tag, wherein the radio frequency command comprises a plurality of bits; determining a logic level of each of the bits based upon a time length of each of the bits at a voltage level of a voltage waveform by the radio frequency tag; determining whether the radio frequency command is the same as a plurality of first prestored commands based upon the logic level of each of the bits by the radio frequency tag; determining whether to transmit a response signal in response to the radio frequency reader based upon a result of determination of whether the radio frequency command is the same as the first prestored commands by the radio frequency tag, wherein while the radio frequency tag transmits the response signal, the radio frequency tag transmits the response signal at a preset time point; receiving the radio frequency command by another radio frequency tag; determining a logic level of each of the bits based upon a time length of each of the bits at the voltage level of the voltage waveform by the another radio frequency tag; determining whether the radio frequency command is the same as a plurality of second prestored commands based upon the logic level of each of the bits by the another radio frequency tag; and determining whether to transmit another response signal in response to the radio frequency reader based upon a result of determination of whether the radio frequency command is the same as the second prestored commands by the another radio frequency tag, wherein while the another radio frequency tag transmits the another response signal, the another radio frequency tag transmits the another response signal at another preset time point, wherein a time difference of the another preset time point and the preset time point is greater than a threshold.

According to an embodiment, the voltage waveform includes at least one voltage level selected from a group consisting of high voltage, low voltage, zero voltage, positive voltage, and negative voltage.

According to an embodiment, the step of determining whether the radio frequency command is the same as the first prestored commands based upon the logic level of each of the bits to determine whether to transmit the response signal comprises: comparing the radio frequency command with first prestored commands based upon the logic level of each of the bits by the radio frequency tag; and not transmitting the response signal by the radio frequency tag while the radio frequency command is different from each of the first prestored commands.

According to an embodiment, the step of determining whether the radio frequency command is the same as the first prestored commands based upon the logic level of each of the bits to determine whether to transmit the response signal further comprises: transmitting the response signal at the preset time point by the radio frequency tag while the radio frequency command is the same as one of the first prestored commands.

According to an embodiment, the step of determining whether the radio frequency command is the same as the second prestored commands based upon the logic level of each of the bits to determine whether to transmit the another response signal by the another radio frequency tag comprises: comparing the radio frequency command with the second prestored commands based upon the logic level of each of the bits by the another radio frequency tag; and transmitting the another response signal at the another preset time point by the another radio frequency tag while the radio frequency command is the same as one of the second prestored commands.

According to an embodiment, the radio frequency transmission method further comprises: outputting a control signal based upon the response signal by a process circuit of the radio frequency reader to drive an application circuit of the radio frequency reader while the radio frequency tag transmits the response signal.

According to an embodiment, the step of determining whether to transmit the response signal by the radio frequency tag comprises: determining whether to generate the response signal based upon the logic level of each of the bits by a process circuit of the radio frequency tag; and generating the response signals with different logic levels based upon a first press condition and a second press condition of a physical button of the radio frequency tag by the process circuit such that the radio frequency tag transmits the response signal while the process circuit generates the response signal based upon the radio frequency command.

According to an embodiment, in the step of determining the logic level of each of the bits based upon the time length of each of the bits at the voltage level of the voltage waveform by the radio frequency tag, a process circuit of the radio frequency tag determines the logic level of each of the bits, and the process circuit of the radio frequency tag outputs a control signal based upon the radio frequency command to drive an application circuit of the radio frequency tag.

According to an embodiment, the step of transmitting the radio frequency command by the radio frequency reader comprises: respectively generating the radio frequency commands with different logic levels based upon a first press condition and a second press condition of a physical button of the radio frequency reader by a process circuit of the radio frequency reader such that the radio frequency reader transmits the radio frequency command.

According to an embodiment, in the step of transmitting the radio frequency command by the radio frequency reader, the radio frequency reader waits for a preset delay time before transmitting the radio frequency command.

According to an embodiment, the step of determining whether to transmit the response signal by the radio frequency tag comprises: while the radio frequency tag transmits the response signal, the radio frequency tag waits for a preset delay time before transmitting the response signal.

Concisely, according to embodiments of a method and device of radio frequency transmission of the instant disclosure, multiple radio frequency tags can respond to a radio frequency reader at different time points, respectively. In other words, response signals transmitted by multiple radio frequency tags do not interfere with one another, such that the radio frequency reader can receive the response signals transmitted by each of the radio frequency tags. According to a press condition of a physical button, the radio frequency reader and the radio frequency tags can respectively change content of radio frequency commands and the response signals and therefore can interact with one another in radio frequency communication successfully.

DETAILED DESCRIPTION

Figure 1:
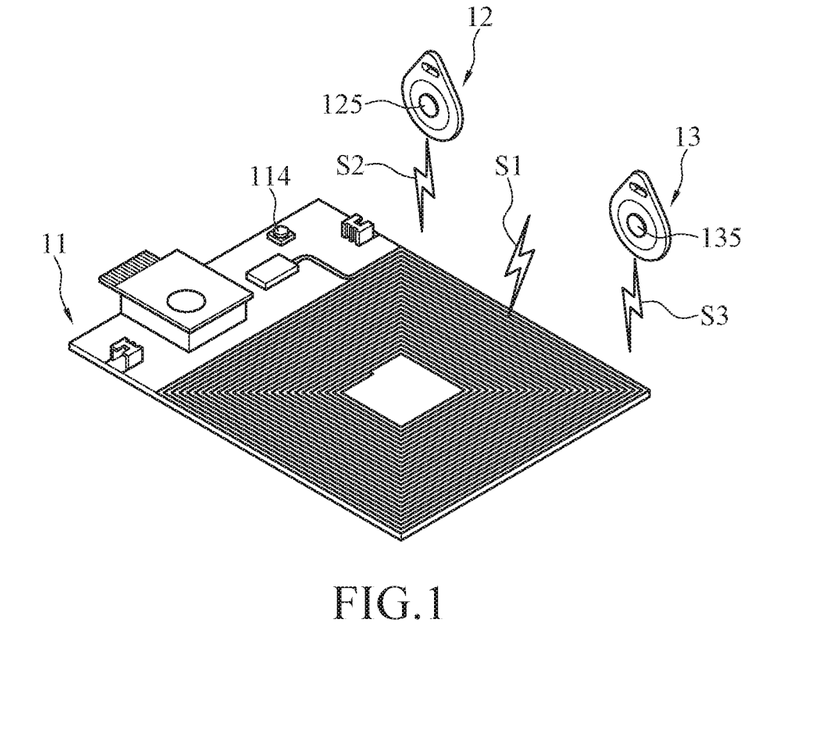
FIG. 1 illustrates a perspective view of a radio frequency transmission device according to an embodiment of the instant disclosure.
Figure 2A:
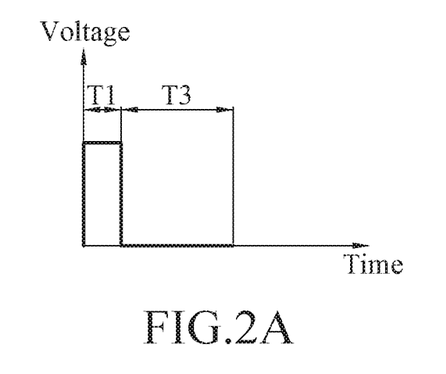
FIG. 2A illustrates an waveform of a bit in a first logic level of a radio frequency command.
Figure 2B:
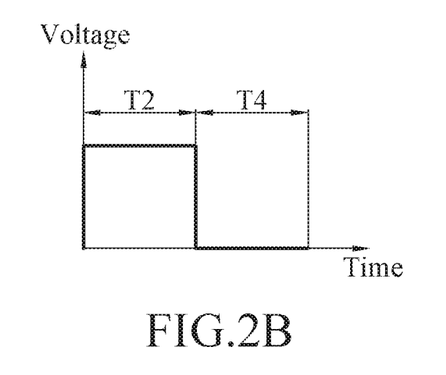
FIG. 2B illustrates an waveform of a bit in a second logic level of a radio frequency command.

FIG. 1 illustrates a perspective view of a radio frequency (RF) transmission device according to an embodiment of the instant disclosure. Please refer to FIG. 1. The radio frequency transmission device comprises a radio frequency reader 11 and a radio frequency tag 12. The radio frequency reader 11 can transmit a radio frequency command S1. The radio frequency tag 12 can receive the radio frequency command S1 transmitted by the radio frequency reader 11. Wherein, the radio frequency command S1 has a plurality of bits, e.g., 6 bits. Each of the bits of the radio frequency command S1 has a first logic level or a second logic level. Time lengths of the bit having the first logic level at a high voltage level and the bit having second logic level at the high voltage level are different. In an embodiment, the high voltage level could be defined as the highest voltage level of the voltage waveform. FIG. 2A illustrates an waveform of a bit in the first logic level of the radio frequency command S1. FIG. 2B illustrates an waveform of a bit in the second logic level of the radio frequency command S1. As shown in FIG. 2A and FIG. 2B, a time length T1 of a bit having the first logic level at the high voltage level is less than a time length T2 of a bit having the second logic level at the high voltage level. In such case, while the radio frequency tag 12 receives the radio frequency command S1, the radio frequency tag 12 determines a logic level of each of the bits of the radio frequency command S1 based upon the time length of each of the bits of the radio frequency command S1 at the high voltage level to determine whether the logic level of each of the bits is the first logic level or the second logic level. After the logic level of each of the bits is determined, the radio frequency tag 12 optionally generates and transmits a response signal S2 based upon the radio frequency command S1.

In an embodiment, the radio frequency tag 12 can be a passive tag. The radio frequency tag 12 is powered to perform further operation after receiving the radio frequency command S1.

Figure 3:
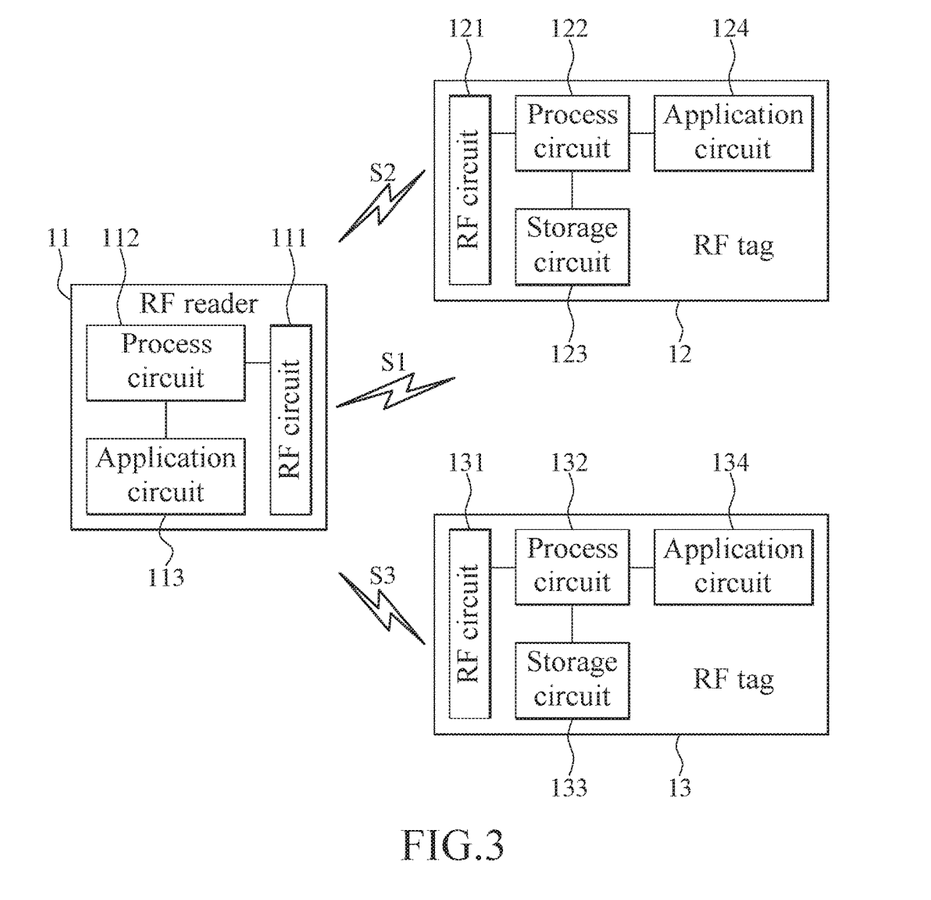
FIG. 3 illustrates a block diagram of a circuit of a radio frequency reader and radio frequency tags of FIG. 1 according to an embodiment.

FIG. 3 illustrates a block diagram of a circuit of the radio frequency reader 11 and the radio frequency tags 12 of FIG. 1 according to an embodiment. Please refer to FIG. 3. The radio frequency reader 11 comprises a radio frequency circuit 111 and a process circuit 112. The radio frequency circuit 111 is connected to the process circuit 112. The process circuit 112 can generate the radio frequency command S1 and transmit the radio frequency command S1 to the radio frequency circuit 111 for transmitting. The radio frequency tag 12 comprises a radio frequency circuit 121 and a process circuit 122 connected to the radio frequency circuit 121. The radio frequency circuit 121 can receive the radio frequency command S1 from the radio frequency reader 11 and transmit the radio frequency command S1 to the process circuit 122. The process circuit 122 can determine the logic level of each of the bits of the radio frequency command S1 and, accordingly, generate a response signal S2 optionally based upon the time length of each of the bits at the high voltage level. While the process circuit 122 determines to generate the response signal S2, the process circuit 122 transmits the response signal S2 to the radio frequency circuit 121 for transmitting.

In practice, a designer can define the time lengths of the first logic level and the second logic level at the high voltage level respectively in advance (for the convenience of description, the time lengths T1, T2 of the first logic level and the second logic level at the high voltage level are respectively referred to the first time length T1 and the second time length T2 hereinafter). For instance, the first time length T1 and the second time length T2 are respectively 1 ms and 3 ms; alternatively, the first time length T1 and the second time length T2 can respectively be 244 μs and 488 μs. As a result, the process circuit 112 of the radio frequency reader 11 can generate each of the bits of the radio frequency command S1 based upon the first time length T1 and the second time length T2 which are predefined, such that each of the bits has the first logic level or the second logic level. In addition, the radio frequency tag 12 can also determine the logic level of each of the bits of the radio frequency command S1 based upon the first time length T1 and the second time length T2 which are predefined. In the case that the first time length T1 and the second time length T2 are respectively 1 ms and 3 ms, while the time length of a bit (e.g., the second bit) of the radio frequency command S1 at the high voltage level is 3 ms, the process circuit 122 can determine that the aforementioned second bit has the second logic level, and while the time length of another bit (e.g., the fifth bit) of the radio frequency command S1 at the high voltage level is 1 ms, the process circuit 122 can determine that the fifth bit has the first logic level.

In an embodiment, as shown in FIG. 2A and FIG. 2B, a designer can further define the time lengths of the first logic level and the second logic level at the low voltage level respectively (for the convenience of description, the time lengths of the first logic level and the second logic level at the low voltage level are respectively referred to the third time length T3 and the fourth time length T4 hereinafter). In an embodiment, the low voltage level could be defined as the lowest voltage level of the voltage waveform. Wherein, the third time length T3 can be the same as or different from the fourth time length T4. In the case that the third time length T3 is the same as the fourth time length T4, both of the third time length T3 and the fourth time length T4 can be 3 ms. In the case that the third time length T3 is different from the fourth time length T4, the third time length T3 can be 244 µs, and the fourth time length T4 can be 488 µs. As a result, the process circuit 112 of the radio frequency reader 11 can generate each of the bits of the radio frequency command S1 based upon the first time length T1, the second time length T2, the third time length T3, and the fourth time length T4 which are predefined, and the process circuit 122 of the radio frequency tag 12 can determine the logic level of each of the bits based upon the first time length T1, the second time length T2, the third time length T3, and the fourth time length T4 which are predefined. In the case of the aforementioned second bit and fifth bit of the radio frequency command S1, while the time lengths of the fifth bit at the high voltage level and the low voltage level are respectively 1 ms and 3 ms, the process circuit 122 can determine that the fifth bit has the first logic level, and while the time lengths of the second bit at the high voltage level and the low voltage level are both 3 ms, the process circuit 122 can determine that the second bit has the second logic level.

In an embodiment, while the radio frequency tag 12 receives the radio frequency command S1, the radio frequency tag 12 compares the radio frequency command S1 and a plurality of prestored commands by the process circuit 122 to optionally generate the response signal S2. Particularly, as shown in FIG. 3, the radio frequency tag 12 further comprises a storage circuit 123 coupled to the process circuit 122. The storage circuit 123 can store the aforementioned prestored commands. The process circuit 122 can read each of the prestored commands from the storage circuit 123 and compare each of the bits of the radio frequency command S1 with each of the bits of each of the prestored commands after the logic level of each of the bits of the radio frequency command S1 is determined. While the radio frequency command S1 is the same as any one of the prestored commands, the process circuit 122 determines whether to generate the response signal S2 based upon the radio frequency command S1 such that the radio frequency circuit 121 transmits the response signal S2 optionally. While the radio frequency command S1 is different from each of the prestored commands, the process circuit 122 does not generate the response signal S2 such that the radio frequency circuit 121 does not transmit the response signal S2.

In an embodiment, as shown in FIG. 1 and FIG. 3, the radio frequency transmission device further comprises another radio frequency tag 13. The radio frequency tag 13 comprises a radio frequency circuit 131, a storage circuit 133, and a process circuit 132. The process circuit 132 is connected between the radio frequency circuit 131 and the storage circuit 133. The radio frequency circuit 131 can receive the radio frequency command S1 transmitted by the radio frequency reader 11. The process circuit 132 can determine the logic level of each of the bits of the radio frequency command S1 based upon the first time length T1 and the second time length T2, or determine the logic level of each of the bits of the radio frequency command S1 based upon the first time length T1, the second time length T2, the third time length T3, and the fourth time length T4. Then the process circuit 132 can compare the radio frequency command S1 with the prestored commands in the storage circuit 133 (for the convenience of description, the prestored command in the storage circuit 123 is referred to the first prestored command hereinafter, and the prestored command in the storage circuit 133 is referred to the second prestored command hereinafter) so as to determine whether to generate another response signal S3 (for the convenience of description, the response signal generated by the process circuit 122 is referred to the first response signal S2 hereinafter, and the response signal generated by the process circuit 132 is referred to the second response signal S3 hereinafter). Wherein, while the radio frequency command S1 is the same as any one of the second prestored commands, the process circuit 132 generates the second response signal S3 optionally based upon the radio frequency command S1, and while the radio frequency command S1 is different from each of the second prestored commands, the process circuit 132 does not generate the second response signal S3.

In such case, while the process circuit 122 of the radio frequency tag 12 and the process circuit 132 of the radio frequency tag 13 generate the first response signal S2 and the second response signal S3 respectively, the radio frequency circuit 121 transmits the first response signal S2 at a first preset time point being designated in advance, and the radio frequency circuit 131 transmits the second response signal S3 at a second preset time point being designated in advance. A time difference of the aforementioned second preset time point and first preset time point is greater than a threshold, such that the radio frequency tag 13 can receive the two response signals S2, S3 at different time points, respectively. For instance, in the case that the aforementioned threshold is 1 ms, the radio frequency circuit 121 can transmit the first response signal S2 at the preset time point 8 ms later than the time when the process circuit 122 determines that the radio frequency command S1 is the same as any one of the first prestored commands, and the radio frequency circuit 131 can transmit the second response signal S3 at the preset time point 6 ms later or other time having a time difference greater than 1 ms from 8 ms, e.g., 10 ms, 15 ms, or 3 ms, later than the time when the process circuit 132 determines that the radio frequency command S1 is the same as any one of the second prestored commands. In such case, the first response signal S2 and the second response signal S3 transmitted by the radio frequency tags 12, 13 do not interfere with each other; therefore, the first response signal S2 and the second response signal S3 transmitted by the radio frequency tags 12, 13 can be received by the radio frequency reader 11.

The radio frequency transmission device of the above embodiments comprises the two radio frequency tags 12, 13; however, the instant disclosure is not limited to the above embodiments. The radio frequency transmission device can comprise more radio frequency tags. For example, the number of the radio frequency tags can be three, four, or greater than ten. Comparing to prior arts, multiple radio frequency tags of the instant disclosure can respond to the radio frequency reader 11 at different time points. In other words, the response signals transmitted by multiple radio frequency tags do not interfere with one another, such that the radio frequency reader 11 can receive the response signals transmitted by each of the radio frequency tags and operate accordingly. As shown in FIG. 3, the radio frequency reader 11 further comprises an application circuit 113. The application circuit 113 is coupled to an output pin of the process circuit 112. The process circuit 112 can generate corresponding control signals respectively based upon the first response signal S2 and the second response signal S3 and transmit the corresponding control signals to the application circuit 113 by the output pin, such that the application circuit 113 can operate accordingly. For instance, the application circuit 113 can be a video and audio playing circuit or a lighting circuit. In a case that the application circuit 113 is the video and audio playing circuit, the application circuit 113 can be controlled by the control signal to play corresponding audio data, video data, or video and audio data. In a case that the application circuit 113 is the lighting circuit, the application circuit 113 can be controlled by the control signal to be switched to a corresponding lighting mode.

In an embodiment, the radio frequency reader 11 further comprises a housing (not shown) and a physical button 114 coupled to an input pin of the process circuit 112. The physical button 114 and the process circuit 112 can be respectively disposed on the housing and inside the housing. The physical button 114 has two different press conditions (referred to a first press condition and a second press condition hereinafter). The first press condition and the second press condition can be a condition that the physical button 114 is pressed and a condition that the physical button 114 is not pressed, respectively. The process circuit 112 can receive the press condition of the physical button 114 from the aforementioned input pin and generate different radio frequency commands S1 based upon different press conditions (i.e., the logic level of at least one bit of the radio frequency command S1 is determined by the press condition of the physical button 114). For instance, while the physical button 114 is in the first press condition, a bit (e.g., the second bit) of the radio frequency command S1 generated by the process circuit 112 has the first logic level, and while the physical button 114 is in the second press condition, the second bit of the radio frequency command S1 generated by the process circuit 112 has the second logic level. As a result, a user of the radio frequency transmission device can change the radio frequency command S1 by changing the press condition of the physical button 114 to control the radio frequency tags 12, 13 to operate accordingly.

In addition, the radio frequency tag 12 is used as example. The radio frequency tag 12 further comprises a housing (not shown) and a physical button 125 coupled to an input pin of the process circuit 122. The physical button 125 and the process circuit 122 can be respectively disposed on the housing and inside the housing. The physical button 125 has two different press conditions (referred to the first press condition and the second press condition hereinafter). The first press condition and the second press condition of the physical button 125 can be a condition that the physical button 125 is pressed and a condition that the physical button 125 is not pressed, respectively. The process circuit 122 can receive the press condition of the physical button 125. If the process circuit 122 is going to generate the response signals based upon the radio frequency command S1, the process circuit 122 can generate different second response signals S2 based upon different press conditions (i.e., the logic level of at least one bit of the second response signal S2 is determined by the press condition of the physical button 125). For instance, while the physical button 125 is in the first press condition, a bit (e.g., the third bit) of the second response signal S2 generated by the process circuit 122 has the first logic level, and while the physical button 125 is in the second press condition, the third bit of the second response signal S2 generated by the process circuit 122 has the second logic level. As a result, a user of the radio frequency transmission device can change the second response signal S2 by changing the press condition of the physical button 125 to control the process circuit 112 to operate accordingly. For instance, the process circuit 112 can be driven to generate different radio frequency commands S1 or the process circuit 112 can be used to control the application circuit 113.

Analogously, the radio frequency tag 13 can also comprise a physical button 135 disposed on a housing (not shown) and coupled to an input pin of the process circuit 132. The process circuit 132 can also generate different third response signals S3 based upon different press conditions of the physical button 135 to control the process circuit 112 to operate accordingly. There is no need to go into detail.

In an embodiment, for the purpose that each of the radio frequency tags can receive and determine each of the bits of the radio frequency command S1 correctly, while the radio frequency reader 11 is powered, the radio frequency reader 11 may transmit radio frequency commands continuously. The radio frequency reader 11 may wait for a preset delay time before transmitting each of the radio frequency commands. In other words, the radio frequency reader 11 does not transmit radio frequency signals during the preset delay time. The radio frequency reader 11 starts to transmit the radio frequency command S1 when a time length of the waiting duration of the radio frequency reader 11 equals to the preset delay time, which can be referred to an initial mark of the radio frequency command S1.

Figure 4:
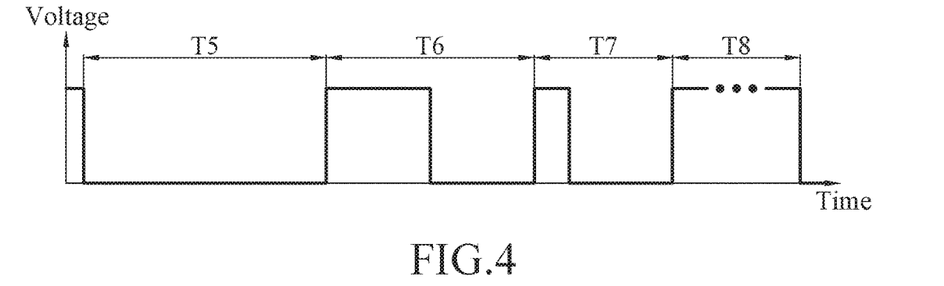
FIG. 4 illustrates an waveform of a radio frequency command transmitted by the radio frequency reader of FIG. 1 according to an embodiment.

FIG. 4 illustrates an waveform of a radio frequency command S1 transmitted by the radio frequency reader of FIG. 1 according to an embodiment. As shown in FIG. 4, the radio frequency reader 11 waits for a preset delay time T5 before transmitting the radio frequency command S1. The preset delay time T5 can be 7 ms. The radio frequency reader 11 waits for 7 ms and then transmits the radio frequency command S1 starting from the first bit thereof (i.e., the first bit, the second bit, and the third bit to the last bit of the radio frequency command S1 are respectively transmitted at a time interval T6, a time interval T7, and a time interval T8). In such case, while any one of the radio frequency tags, e.g., the radio frequency tag 12, is powered, the radio frequency tag 12 detects whether a time length during which there is no any radio frequency signals received (i.e., a time length at low voltage level) equals to 7 ms of the preset delay time T5 in advance. If the radio frequency tag 12 detects that the time length during which there is no any radio frequency signals received does not equal to 7 ms of the preset delay time T5, it means that the radio frequency reader 11 does not transmit the first bit of the radio frequency command S1 yet. In such case, the process circuit 122 does not determine whether to generate the response signal based upon the radio frequency command S1 because the radio frequency tag 12 does not receive the radio frequency command S1 yet or the radio frequency command S1 received by the radio frequency tag 12 is incomplete. On the other hand, while the radio frequency tag 12 detects that the time length during which there is no any radio frequency signals received equals to 7 ms of the preset delay time T5, it means that the radio frequency reader 11 is going to transmit the radio frequency command S1 starting from the first bit of the radio frequency command S1. After the radio frequency reader 11 transmits every bits of the radio frequency command S1, the radio frequency tag 12 can determine the logic level of each of the bits of the radio frequency command S1 and compare each of the first prestored commands in the storage circuit 123 with the radio frequency command S1 to determine whether to generate the first response signal S2.

In an embodiment, the radio frequency reader 11 can transmit the radio frequency command S1 comprising different information, such that the radio frequency tags 12, 13 can transmit a corresponding response signal or does not transmit any response signals based upon different radio frequency commands S1. For instance, the radio frequency command S1 can comprise vendor identification (Vendor ID, VID) and/or product identification (Product ID, PID). While the radio frequency tags 12, 13 determine that the radio frequency command S1 is the same as any one of the prestored commands, it means that the VID and/or the PID comprised in the radio frequency command S1 is identical with identified information prestored in the prestored command. In such case, the radio frequency tags 12, 13 can transmit the first response signal S2 and the second response signal S3 comprising identification (ID) thereof and/or input data to be transmitted to the radio frequency reader 11. That is to say, the first response signal S2 and the second response signal S3 can comprise a plurality of bits to indicate the aforementioned identification, input data, or other information. Alternatively, the radio frequency command S1 can comprise a verifying mark for verifying whether the radio frequency tag exists but does not comprise the aforementioned VID and PID. While the radio frequency tags 12, 13 determine that the radio frequency command S1 is the same as any one of the prestored commands, it means that the comparison of the verifying mark is successful. In such case, the radio frequency tags 12, 13 may not transmit the first response signal S2 and the second response signal S3, or the radio frequency tags 12, 13 may transmit the first response signal S2 and the second response signal S3 comprising the aforementioned identification and/or input data.

In addition, while any one of the radio frequency tags 12, 13 is going to transmit the response signal, the radio frequency tags 12, 13 wait for another fixed preset delay time, e.g., 4 ms, before transmitting the response signals S2, S3, which can be referred to initial marks of transmitting the first response signal S2 and the second response signal S3. In the case that the radio frequency tag 12 waits for 4 ms of the preset delay time before transmitting the first response signal S2, the radio frequency reader 11 waits for 4 ms of the preset delay time after transmitting the radio frequency command S1. After 4 ms, the radio frequency reader 11 starts to receive the first bit of the first response signal S2 transmitted by the radio frequency tag 12.

In addition, the process circuits 122, 132 not only determine whether to generate the response signals based upon the radio frequency command S1 but also determine whether to generate a corresponding output signal based upon the radio frequency command S1. In the embodiment, the process circuits 122, 132 comprise output pins. While the process circuits 122, 132 respectively generate control signals based upon the radio frequency command S1, the two control signals can be outputted by the output pins of the two process circuits 122, 132, respectively. The radio frequency tags 12, 13 further comprise other application circuits 124, 134, e.g., lighting circuits, motor driving circuits, or video and audio playing circuits. The application circuits 124, 134 are respectively coupled to the output pins of the process circuits 122, 132 and are respectively controlled by the process circuits 122, 132. In a case that the application circuits 124, 134 are the lighting circuits, the application circuits 124, 134 can generate corresponding lighting modes based upon the control signals. In a case that the application circuits 124, 134 are the video and audio playing circuits, the application circuits 124, 134 can play audio data, video data, or video and audio data based upon the control signals. In a case that the application circuits 124, 134 are the motor driving circuits, the application circuits 124, 134 can respectively control the motor to rotate forward or reversely based upon the control signals. While the radio frequency tags 12, 13 are incorporated with an object with wheels, the wheels can rotate forward or backward based upon the forward or reverse rotation of the motor.

In an embodiment, the frequency of the response signal and the radio frequency command S1 may be 125 kHz. That is to say, the radio frequency reader 11 and each of the radio frequency tags 12, 13 can communicate with one another via the frequency of 125 kHz. As a result, the radio frequency reader 11 and each of the radio frequency tags 12, 13 can communicate with one another via low frequency so as to save power. In addition, the radio frequency signals of low frequency do not interfere with current wireless communication signals, e.g., Bluetooth signals, Wi-Fi signals, and mobile phone signals.

Figure 5:
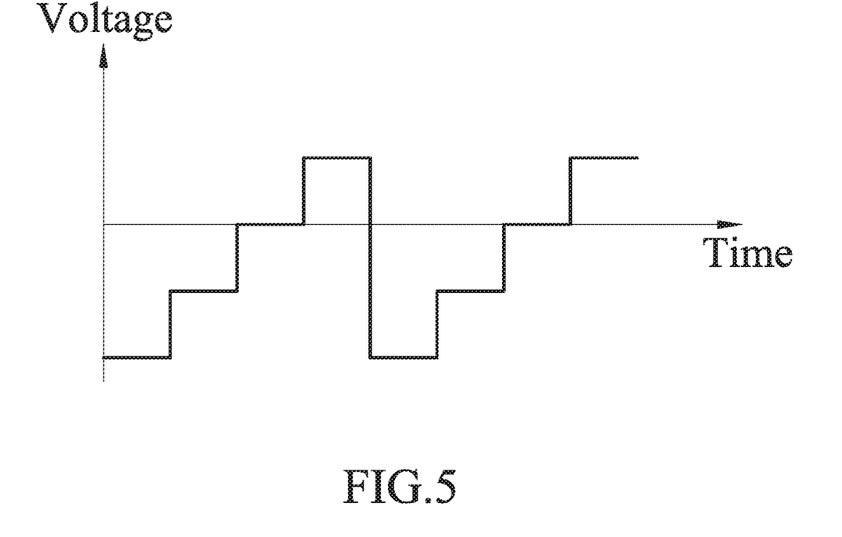
FIG. 5 illustrates a voltage waveform according to an embodiment.

FIG. 5 illustrates a voltage waveform according to an embodiment. The voltage waveform is in a form of step and consisting of four voltage levels which includes two different negative voltage levels, one zero voltage level, and one positive voltage level. The voltage waveform according to another embodiment is a waveform obtained from converting an analog waveform (for example, a sine waveform or a triangle waveform) into a digital waveform by an analog-to-digital converter.

Concisely, according to embodiments of a method and device of radio frequency transmission of the instant disclosure, multiple radio frequency tags can respond to a radio frequency reader at different time points, respectively. In other words, response signals transmitted by multiple radio frequency tags do not interfere with one another, such that the radio frequency reader can receive the response signals transmitted by each of the radio frequency tags. According to a press condition of a physical button, the radio frequency reader and the radio frequency tags can respectively change content of radio frequency commands and the response signals and therefore can interact with one another in radio frequency communication successfully.

While the instant disclosure has been described by way of example and in terms of the preferred embodiments, it is to be understood that the instant disclosure needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A radio frequency transmission device, comprising:
a radio frequency reader for transmitting a radio frequency command, the radio frequency command comprising a plurality of bits;
a radio frequency tag receiving the radio frequency command, the radio frequency tag determining a logic level of each of the bits based upon a time length of each of the bits at a voltage level of a voltage waveform, the radio frequency tag determining whether the radio frequency command is the same as a plurality of first prestored commands based upon the logic level of each of the bits to determine whether to transmit a response signal in response to the radio frequency reader based upon a result of determination of whether the radio frequency command is the same as the first prestored commands; and another radio frequency tag receiving the radio frequency command, the another radio frequency tag determining a logic level of each of the bits based upon a time length of each of the bits at the voltage level of the voltage waveform, the another radio frequency tag determining whether the radio frequency command is the same as a plurality of second prestored commands based upon the logic level of each of the bits to determine whether to transmit another response signal in response to the radio frequency reader based upon a result of determination of whether the radio frequency command is the same as the second prestored commands;

wherein while the radio frequency tag transmits the response signal, the radio frequency tag transmits the response signal at a preset time point, and while the another radio frequency tag transmits the another response signal, the another radio frequency tag transmits the another response signal at another preset time point, wherein a time difference of the preset time point and the another preset time point is greater than a threshold.

2. The radio frequency transmission device of claim 1, wherein the radio frequency reader waits for a preset delay time before transmitting the radio frequency command.

3. The radio frequency transmission device of claim 1, wherein the radio frequency tag compares the radio frequency command with the first prestored commands based upon the logic level of each of the bits to determine whether to transmit the response signal, and while the radio frequency command is different from the first prestored commands, the radio frequency tag does not transmit the response signal.

4. The radio frequency transmission device of claim 3, wherein while the radio frequency command is the same as one of the first prestored commands, the radio frequency tag transmits the response signal at the preset time point.

5. The radio frequency transmission device of claim 4, wherein the another radio frequency tag compares the radio frequency command with the second prestored commands based upon the logic level of each of the bits, and while the radio frequency command is the same as one of the second prestored commands, the another radio frequency tag transmits the another response signal at the another preset time point.

6. The radio frequency transmission device of claim 1, wherein the voltage waveform comprises at least one voltage level selected from the group consisting of high voltage, low voltage, zero voltage, positive voltage, and negative voltage.

7. The radio frequency transmission device of claim 1, wherein while the radio frequency tag transmits the response signal, the radio frequency tag waits for a preset delay time before transmitting the response signal at the preset time point.

8. The radio frequency transmission device of claim 1, wherein the radio frequency tag comprises:

a process circuit determining the logic level of each of the bits based upon the time length of each of the bits at the voltage level of the voltage waveform to determine whether to generate the response signal and output a control signal based upon the radio frequency command; and an application circuit controlled by the control signal.

9. The radio frequency transmission device of claim 8, wherein the radio frequency tag further comprises:

a physical button coupled to the process circuit, the physical button comprising a first press condition and a second press condition, the process circuit generating the response signals with different logic levels based upon the first press condition and the second press condition.

10. The radio frequency transmission device of claim 1, wherein the radio frequency reader comprises:

a process circuit determining a logic level of each of bits of the response signal based upon a time length of each of the bits of the response signal at the voltage level of the voltage waveform to determine whether to output a control signal based upon the response signal; and an application circuit controlled by the control signal.

11. The radio frequency transmission device of claim 10, wherein the process circuit is further for generating the radio frequency command, and the radio frequency reader further comprises:

a physical button coupled to the process circuit, the physical button comprising a first press condition and a second press condition, the process circuit generating the radio frequency commands with different logic levels based upon the first press condition and the second press condition.

12. A radio frequency transmission method, comprising:

transmitting a radio frequency command by a radio frequency reader;

receiving the radio frequency command by a radio frequency tag, the radio frequency command comprising a plurality of bits;

determining a logic level of each of the bits based upon a time length of each of the bits at a voltage level of a voltage waveform by the radio frequency tag;

determining whether the radio frequency command is the same as a plurality of first prestored commands based upon the logic level of each of the bits by the radio frequency tag;

determining whether to transmit a response signal in response to the radio frequency reader based upon a result of determination of whether the radio frequency command is the same as the first prestored commands by the radio frequency tag, wherein while the radio frequency tag transmits the response signal, the radio frequency tag transmits the response signal at a preset time point;

receiving the radio frequency command by another radio frequency tag;

determining a logic level of each of the bits based upon a time length of each of the bits at the voltage level of the voltage waveform by the another radio frequency tag;

determining whether the radio frequency command is the same as a plurality of second prestored commands based upon the logic level of each of the bits by the another radio frequency tag; and determining whether to transmit another response signal in response to the radio frequency reader based upon a result of determination of whether the radio frequency command is the same as the second prestored commands by the another radio frequency tag, wherein while the another radio frequency tag transmits the another response signal, the another radio frequency tag transmits the another response signal at another preset time point, wherein a time difference of the another preset time point and the preset time point is greater than a threshold.

13. The radio frequency transmission method of claim 12, wherein the voltage waveform comprises at least one voltage level selected from the group consisting of high voltage, low voltage, zero voltage, positive voltage, and negative voltage.

14. The radio frequency transmission method of claim 12, wherein the step of determining whether the radio frequency command is the same as the first prestored commands based upon the logic level of each of the bits to determine whether to transmit the response signal comprises:
   comparing the radio frequency command with the first prestored commands based upon the logic level of each of the bits by the radio frequency tag; and
   not transmitting the response signal by the radio frequency tag while the radio frequency command is different from each of the first prestored commands.

15. The radio frequency transmission method of claim 14, wherein the step of determining whether the radio frequency command is the same as the first prestored commands based upon the logic level of each of the bits to determine whether to transmit the response signal further comprises: transmitting the response signal at the preset time point by the radio frequency tag while the radio frequency command is the same as one of the first prestored commands.

16. The radio frequency transmission method of claim 15, wherein the step of determining whether the radio frequency command is the same as the second prestored commands based upon the logic level of each of the bits to determine whether to transmit the another response signal by the another radio frequency tag comprises:
   comparing the radio frequency command with the second prestored commands based upon the logic level of each of the bits by the another radio frequency tag; and
   transmitting the another response signal at the another preset time point by the another radio frequency tag while the radio frequency command is the same as one of the second prestored commands.

17. The radio frequency transmission method of claim 12, further comprising: outputting a control signal based upon the response signal by a process circuit of the radio frequency reader to drive an application circuit of the radio frequency reader while the radio frequency tag transmits the response signal.

18. The radio frequency transmission method of claim 12, wherein the step of determining whether to transmit the response signal by the radio frequency tag comprises:
   determine whether to generate the response signal based upon the logic level of each of the bits by a process circuit of the radio frequency tag; and
   generating the response signals with different logic levels based upon a first press condition and a second press condition of a physical button of the radio frequency tag by the process circuit such that the radio frequency tag transmits the response signal while the process circuit generates the response signal based upon the radio frequency command.

19. The radio frequency transmission method of claim 12, wherein in the step of determining the logic level of each of the bits based upon the time length of each of the bits at the voltage level of the voltage waveform by the radio frequency tag, a process circuit of the radio frequency tag determines the logic level of each of the bits, and the process circuit outputs a control signal based upon the radio frequency command to drive an application circuit of the radio frequency tag.

20. The radio frequency transmission method of claim 12, wherein the step of transmitting the radio frequency command by the radio frequency reader comprises: respectively generating the radio frequency commands with different logic levels based upon a first press condition and a second press condition of a physical button of the radio frequency reader by a process circuit of the radio frequency reader such that the radio frequency reader transmits the radio frequency command.

21. The radio frequency transmission method of claim 12, wherein in the step of transmitting the radio frequency command by the radio frequency reader, the radio frequency reader waits for a preset delay time before transmitting the radio frequency command.

22. The radio frequency transmission method of claim 12, wherein the step of determining whether to transmit the response signal by the radio frequency tag comprises: while the radio frequency tag transmits the response signal, the radio frequency tag waits for a preset delay time before transmitting the response signal.

\* \* \* \* \*